(12) United States Patent
Okumura

(10) Patent No.: US 7,468,770 B2
(45) Date of Patent: Dec. 23, 2008

(54) VIEWING ANGLE CONTROL ELEMENT, METHOD OF MANUFACTURING THE SAME, LIQUID CRYSTAL DISPLAY DEVICE, AND ELECTRONIC APPARATUS

(75) Inventor: Osamu Okumura, Suwa (JP)

(73) Assignee: Seiko Epson Corporation (JP)

( * ) Notice: Subject to any disclaimer, the term of this patent is extended or adjusted under 35 U.S.C. 154(b) by 498 days.

(21) Appl. No.: 11/065,795

(22) Filed: Feb. 25, 2005

(65) Prior Publication Data

US 2005/0190329 A1    Sep. 1, 2005

(30) Foreign Application Priority Data

Feb. 26, 2004    (JP)    ............... 2004-051665
Jul. 15, 2004    (JP)    ............... 2004-208594

(51) Int. Cl.
*G02F 1/1337*    (2006.01)

(52) U.S. Cl. .................. 349/123; 349/124; 349/125; 349/126; 349/127; 349/128; 349/129; 349/130; 349/74; 349/75; 349/76; 349/77; 349/78; 349/79; 349/80; 349/81; 349/82; 349/83

(58) Field of Classification Search ......... 349/123–130, 349/73–83, 117–121
See application file for complete search history.

(56) References Cited

U.S. PATENT DOCUMENTS

| | | | | |
|---|---|---|---|---|
| 4,824,216 A | * | 4/1989 | Perbet et al. | 349/74 |
| 5,119,216 A | * | 6/1992 | Wada et al. | 349/76 |
| 5,677,747 A | * | 10/1997 | Ishikawa et al. | 349/76 |
| 6,211,930 B1 | * | 4/2001 | Sautter et al. | 349/66 |
| 7,068,336 B2 | * | 6/2006 | Oh et al. | 349/123 |
| 2002/0063829 A1 | * | 5/2002 | Manabe et al. | 349/117 |
| 2006/0072054 A1 | * | 4/2006 | Ito | 349/96 |

FOREIGN PATENT DOCUMENTS

| | | |
|---|---|---|
| JP | 05-107534 | 4/1993 |
| JP | 8-248210 | 9/1996 |
| JP | 11-174489 | 7/1999 |
| JP | 2000-66191 | 3/2000 |
| JP | 2000-66193 | 3/2000 |
| JP | 2000-338489 | 12/2000 |
| JP | 2001-000907 | 1/2001 |
| KR | 1999-016189 | 3/1999 |

OTHER PUBLICATIONS

Communication from Korean Patent Office regarding corresponding application, Jul. 2006.

* cited by examiner

*Primary Examiner*—David C. Nelms
*Assistant Examiner*—Thanh-Nhan P Nguyen
(74) *Attorney, Agent, or Firm*—Harness, Dickey & Pierce, P.L.C.

(57) ABSTRACT

A liquid crystal display device includes a display panel and a viewing angle control panel. The viewing angle control panel includes a pair of substrates, a liquid crystal layer interposed between the pair of substrates, and a pair of electrodes for applying an electric field to the liquid crystal layer. The liquid crystal layer is composed from hybrid-aligned liquid crystal molecules. The viewing angle of the display panel is controlled by changing an alignment state of the hybrid-aligned liquid crystal molecules in the liquid crystal layer by voltage applied by the electrodes.

4 Claims, 13 Drawing Sheets

VIEWING ANGLE CONTROL ELEMENT, METHOD OF MANUFACTURING THE SAME, LIQUID CRYSTAL DISPLAY DEVICE, AND ELECTRONIC APPARATUS

RELATED APPLICATIONS

This application claims priority to Japanese Patent Application Nos. 2004-051665 filed Feb. 26, 2004 and 2004-208594 filed Jul. 15, 2004 which are hereby expressly incorporated by reference herein in their entirety.

BACKGROUND OF THE INVENTION

1. Technical Field

The present invention relates to a viewing angle control element, a method of manufacturing the same, a liquid crystal display device, and an electronic apparatus, and particularly, to a viewing angle control element having a switching function between a wide viewing angle and a narrow viewing angle and to a liquid crystal display device equipped with the same.

2. Related Art

Conventionally, liquid crystal display devices have a problem in that a viewing angle is narrow. Therefore, in recent years, it is demanded a liquid crystal display device having a wide viewing angle. Particularly, liquid crystal display devices used for a television, a car navigation apparatus, a digital camera, etc., which are viewed by many people need to have the wide viewing angle. Meanwhile, it is demanded a structure in which other people do not peek at a user's display screen. In this case, the liquid crystal display devices need to have a narrow viewing angle. For example, when the liquid crystal display devices are used for notebook personal computers or mobile phones that are generally used at a public place, such a narrow viewing angle function is required. In recent years, it has been strongly demanded that a display device should perform the switching of a viewing angle between a wide viewing angle and a narrow viewing angle according to the method of use as in a case in which a user watches a television program using a notebook personal computer or plays a computer game using a mobile phone.

In order to meet the above-mentioned demands, Japanese Unexamined Patent Application Publication No. 11-174489 proposes a liquid crystal display device provided with a liquid crystal element for display and a liquid crystal element for phase difference control to change a viewing angle characteristic by controlling a voltage applied to the liquid crystal element for phase difference control. In Japanese Unexamined Patent Application Publication No. 11-174489, chiral nematic liquid crystal, homogeneous liquid crystal, nematic liquid crystal having random alignment, or the like is used as a liquid crystal mode for the liquid crystal element for phase difference control.

SUMMARY

In Japanese Unexamined Patent Application Publication No. 11-174489, the switching of a viewing angle between a wide viewing angle and a narrow viewing angle is performed by the liquid crystal element for phase difference control, but a sufficient switching effect is not obtained in this case. For example, in Japanese Unexamined Patent Application Publication No. 11-174489, a contrast curve having a contrast ratio of 10:1 is shown in FIG. 4, and contrast in the direction of a wide viewing angle is remarkably lowered in a narrow viewing angle mode. In this case, another person just next to a user can see the display screen of the user. In general, display can be sufficiently seen even when a contrast ratio is lowered up to 2:1.

An advantage of the present invention to provide a viewing angle control element having a high switching effect between a wide viewing angle and a narrow viewing angle. The viewing angle control element can be used in a liquid crystal display device applicable to various utility environments and purposes.

A first aspect of the present invention is a viewing angle control element provided adjacent to a display device to control the viewing angle of the display device. The viewing angle control element includes a viewing angle control panel. The viewing angle control panel includes: a pair of transparent substrates; a liquid crystal layer interposed between the pair of transparent substrates and having hybrid-aligned liquid crystal molecules therein; and electric field applying unit for applying an electric field to the liquid crystal layer, wherein the alignment state of the liquid crystal molecules is changed by a voltage applied from the electric field applying unit to control the viewing angle of the display device.

There has already been known a technique of performing viewing angle control using a liquid crystal panel as in Japanese Unexamined Patent Application Publication No. 11-174489. However, the inventors of the present invention concluded that the limit of the viewing angle control effect in Japanese Unexamined Patent Application Publication No. 11-174489 results from using the chiral nematic liquid crystal, the homogeneous liquid crystal, the nematic liquid crystal having random alignment, or the like for the viewing angle control panel. That is, these types of liquid crystal originally contribute to only the lowering of contrast in display. On the contrary, the inventors found that, by using hybrid-aligned liquid crystal for the viewing angle control panel, the viewing angle could be greatly limited to a narrow viewing angle (when the viewing angle is limited) mode by reducing the amount of transmission light (by darkening the display) rather than by lowering the contrast of display on the wide viewing angle side. The reason why the amount of transmission light on the wide viewing angle side is changed by the variation of the arrangement state of the hybrid-aligned liquid crystal will be described in detail in later.

In the viewing angle control element according to the present invention, it is preferable that polarizing plates be provided on outer surfaces of the viewing angle control panel, respectively, and that absorption axes of the polarizing plates be arranged parallel to each other.

Further, in the present specification, the terms 'outer surface' and 'inner surface' of the liquid crystal panel or substrate are used. The term 'inner surface' means one of the main surfaces of each substrate facing the liquid crystal layer, and the term 'outer surface' means one of the main surfaces of each substrate opposite to the liquid crystal layer.

According to this structure, incident light is polarized into linearly polarized light by the polarizing plate on the incident side, and the linearly polarized light is incident on the liquid crystal layer having hybrid-aligned liquid crystal therein. Then, the linearly polarized light generates optical rotation in a predetermined direction of the azimuthal direction of the surface of the substrate, and appears to be dark under the parallel Nicols.

Further, in the viewing angle control element of the present invention, it is preferable that the absorption axes of the polarizing plates be arranged parallel to or orthogonal to slow axes of the liquid crystal molecules as seen from the normal direction of the viewing angle control panel.

According to this structure, the liquid crystal layer does not exhibit a birefringence effect on light incident in the normal direction of the viewing angle control panel. Therefore, it is possible to hardly damage the display characteristics of a display device.

Furthermore, more preferably, the absorption axes of the polarizing plates are arranged parallel to the slow axes of the liquid crystal molecules as seen from the normal direction of the viewing angle control panel.

In this way, it is possible to effectively control a viewing angle within a wider viewing angle range, which will be described later.

A liquid crystal material having a negative dielectric anisotropy and a liquid crystal material having a positive dielectric anisotropy can be used as the material for the liquid crystal layer. However, preferably, the liquid crystal layer is composed of the liquid crystal material having the negative dielectric anisotropy.

When the liquid crystal material having the negative dielectric anisotropy is used, it is possible to widen a viewing angle when a selection voltage is applied (voltage on), and it is also possible to hardly damage the display characteristics of a display device.

Furthermore, the degree to which the viewing angle can be limited can be adjusted by adjusting the product $\Delta n \cdot d$ of a birefringence $\Delta n$ and a thickness d of the liquid crystal layer in the viewing angle control panel.

Since the transmittance characteristic is changed in the polar angle direction of the surface of the substrate by the adjustment of the value of $\Delta n \cdot d$, it is possible to select an optimum value of $\Delta n \cdot d$ according to the purpose of use.

A liquid crystal display device of the present invention comprises the viewing angle control element according to the present invention and a display panel provided adjacent to the viewing angle control element.

According to this structure, it is possible to obtain display having a high switching effect between a wide viewing angle and a narrow viewing angle by providing the viewing angle control element of the present invention to be adjacent to the display panel, and it is also possible to realize a liquid crystal display device applicable to various utility environments and purposes.

Moreover, in the liquid crystal display device of the present invention, it is preferable that the slow axes of the liquid crystal molecules be arranged to be equal to the vertical direction of a display screen of the display panel. The "vertical direction" of the display screen can alternately be referred to as the 12 o'clock to 6 o'clock direction, or the direction extending between the upper and lower ends of the screen, that is, with respect to symbols and images displayed on the screen of the display panel.

According to this structure, particularly, it is preferable to be able to effectively switch a viewing angle in the horizontal direction (3 o'clock to 9 o'clock) of the display screen. That is because when other people peek at the display screen of a user, generally, people peek at the screen in the horizontal direction.

Further, the liquid crystal display device of the present invention further comprises: a first polarizing plate provided on an outer surface of the display panel opposite to the viewing angle control panel; a second polarizing plate provided on an outer surface of the viewing angle control panel opposite to the display panel; and a third polarizing plate provided between the display panel and the viewing angle control panel.

According to this structure, since the display panel is interposed between the first polarizing plate and the third polarizing plate, these polarizing plates function as a polarizer (light incident side) and an analyzer (light output side), respectively. In addition, since the viewing angle control panel is interposed between the second polarizing plate and the third polarizing plate, it is possible to effectively change limits of the viewing angle by arranging the absorption axes of the polarizing plates in the above-mentioned relationship.

Alternatively, the liquid crystal display device of the present invention further comprises a first polarizing plate provided on an outer surface of the display panel opposite to the viewing angle control panel and a second polarizing plate provided on an outer surface of the viewing angle control panel opposite to the display panel.

According to this structure, since the number of polarizing plates is smaller than the above-mentioned structure by one, the brightness of display increases by the amount corresponding to the reduced number, and it is possible to decrease the total thickness of a liquid crystal display device. In addition, since no polarizing plate is provided between the display panel and the viewing angle control panel, it is possible to obtain operations and effects different from those in the above-mentioned structure by the interaction between two liquid crystal panels, and thus it is possible to restrict a viewing angle in a narrower range, which is described in the third embodiment Further, in the liquid crystal display device of the present invention, a backlight having a concentrating sheet is provided on a surface of the second polarizing plate opposite to the viewing angle control panel.

According to this structure, it is possible to more effectively obtain a viewing angle control effect by synergism with the viewing angle control effect by the concentrating sheet.

Furthermore, in the liquid crystal display device of the present invention, the viewing angle control panel is provided on the side opposite to an observer side of the display panel, and a diffusing plate is provided between the viewing angle control panel and the display panel.

According to this structure, it is difficult to see the leakage of light from the viewing angle control panel by dispersing spacers.

Moreover, according to the present invention, a viewing angle control element provided adjacent to a display device to control the viewing angle of the display device comprises a layer composed of a hybrid-aligned liquid crystal polymer material.

According to this structure, it is difficult to control a viewing angle by an electric field, but it is possible to perform viewing angle control by the same principle as the viewing angle control panel.

Further, a liquid crystal display device of the present invention comprises the viewing angle control element having a liquid crystal polymer layer and a display panel provided adjacent to the viewing angle control element.

According to this structure, the viewing angle can be restricted to specific directions so that people can be prevented from looking at the display from the side and invading the privacy of the user.

Furthermore, an electronic apparatus of the present invention comprises the liquid crystal display device according to the present invention.

According to this structure, it is possible to realize an electronic apparatus including a liquid crystal display unit having a high visual angle control effect and applicable to various utility environments and purposes.

BRIEF DESCRIPTION OF THE DRAWINGS

The invention will be described with reference to the accompanying drawings, wherein like number reference like elements, and wherein.

DESCRIPTION OF THE EMBODIMENTS

Figure 1:
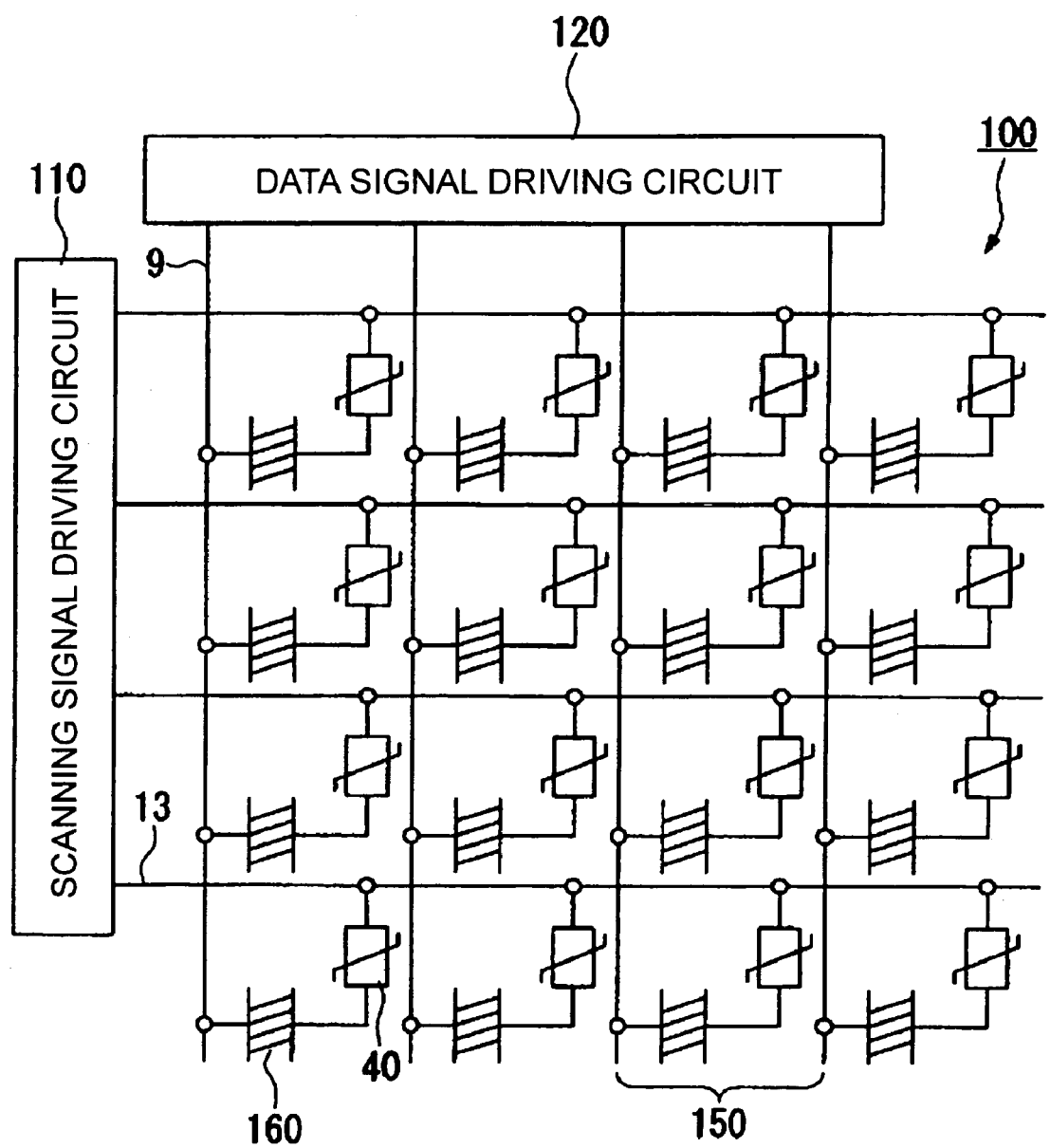
FIG. 1 is a circuit diagram of a liquid crystal display device according to a first embodiment of the present invention.

Hereinafter, a first embodiment of the present invention will be described with reference to FIGS. 1 to 9.

According to a liquid crystal display device of the present embodiment, a liquid crystal panel (cell) that controls viewing angle is stacked on a liquid crystal panel (cell) for display. The viewing angle control panel selectively restricts viewing angle characteristic of the display panel to a narrow viewing angle range. Therefore, it is preferable that the display panel be a liquid crystal mode with a wide viewing angle, such as a VAN (Vertically Aligned Nematic) mode or an IPS (In-Plane Switching) mode. In the present embodiment, VAN will be described as an example. Further, an active matrix transmissive liquid crystal display device using thin film diodes (hereinafter, referred to as TFDs) as pixel switching elements is taken as an example of the display panel. In addition, the reduced scale of each layer and member is different from the actual scale, such that each layer and each member are shown in the drawings to have a recognizable size.

FIG. 1 shows a circuit diagram of liquid crystal panels for display in a liquid crystal display device 100 according to the present embodiment. The liquid crystal display device 100 includes a scanning signal driving circuit 110 and a data signal driving circuit 120. The liquid crystal display device 100 is provided with signal lines, that is, a plurality of scanning lines 13 and a plurality of data lines 9 intersected with the scanning lines 13. The scanning lines 13 are driven by the scanning signal driving circuit 110, and the data lines 9 are driven by the data signal driving circuit 120. In each pixel region 150, a TFD element 40 and a liquid crystal display element 160 (a liquid crystal layer) are connected to each other in series between the scanning line 13 and the data line 9. In FIG. 1, the TFD element 40 is connected to the scanning line 40, and the liquid crystal display element 160 is connected to the data line 9. However, on the contrary, the TFD element 40 may be connected to the data line 9, and the liquid crystal display element 160 may be connected to the scanning line 13.

Next, the plane structure (pixel structure) of an electrode in the display panel of the liquid crystal display device 100 according to the present embodiment will be described with reference to FIG. 2.

Figure 2:
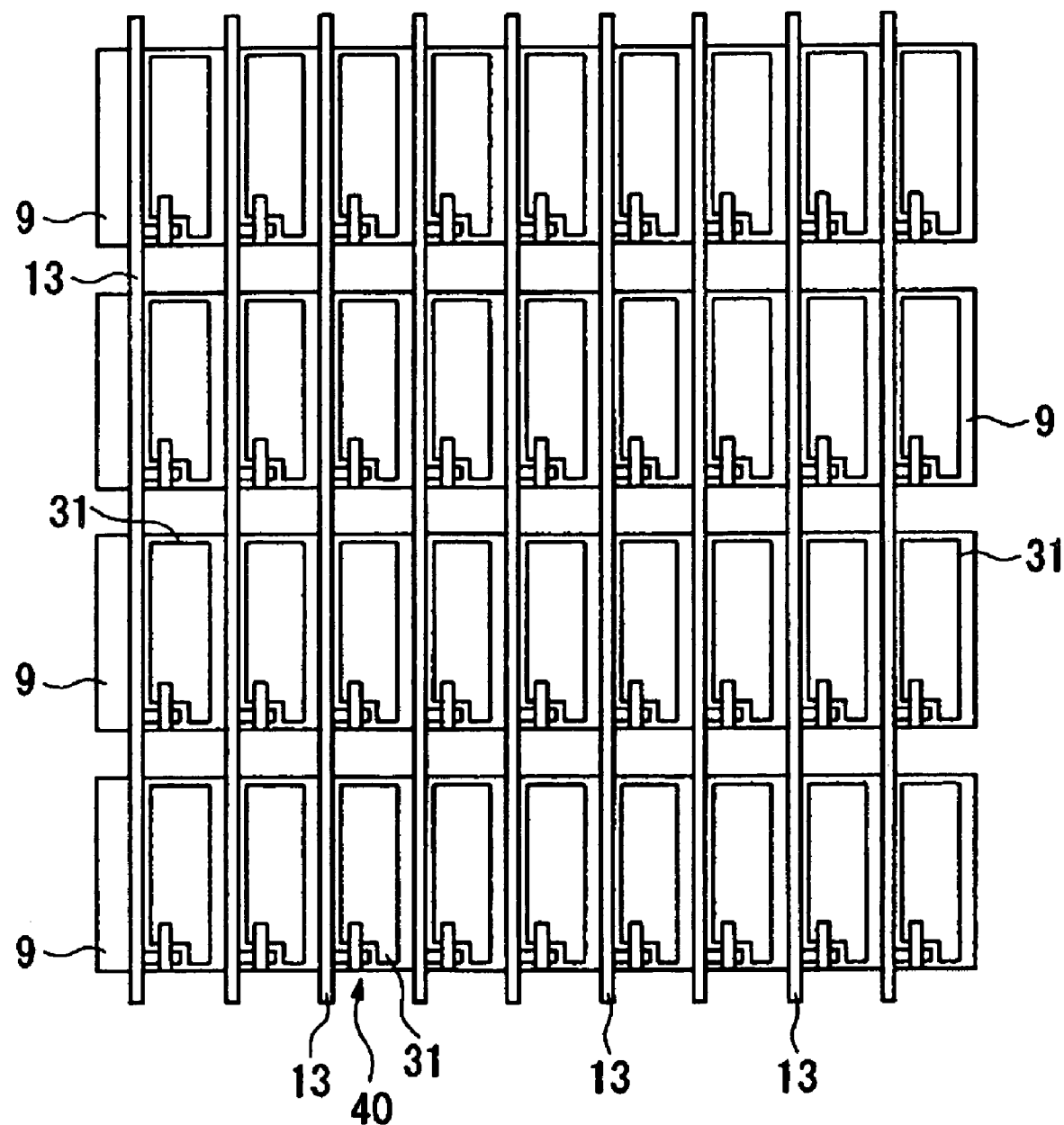
FIG. 2 is a plan view illustrating the structure of dot regions of the liquid crystal display device according to the first embodiment.

As shown in FIG. 2, in the display panel, pixel electrodes 31 connected to the scanning lines 13 through the TFD elements 40 are provided in a matrix, and a counter electrode 9 is provided in a stripe shape so as to be opposite to the pixel electrode 31 in a direction perpendicular to the plane of FIG. 2. The counter electrode 9 serves as the above-mentioned data line and has a stripe shape perpendicular to the scanning line 13. In the present embodiment, each region in which the pixel electrode 31 is formed is a dot region, and the dot regions arranged in a matrix are respectively provided with the TFD elements 40, so that display can be performed on each dot region. In FIG. 2, each pixel electrode is shown substantially in a rectangular shape but has actually an island-shaped portion and a connecting portion, which will be described later. Here, the TFD element 40 is a switching element electrically connecting the scanning line 13 to the pixel electrode 31 and is formed in an MIM (Metal-Insulator-Metal) structure having a first conductive film containing Ta as the main component, an insulating film formed on the surface of the first conductive film and containing $Ta_2O_3$ as the main component, and a second conductive film formed on the surface of the insulating film and containing Cr as the main component. Further, the first conductive film of the TFD element 40 is connected to the scanning line 13, and the second conductive film thereof is connected to the pixel electrode 31.

Figure 3:
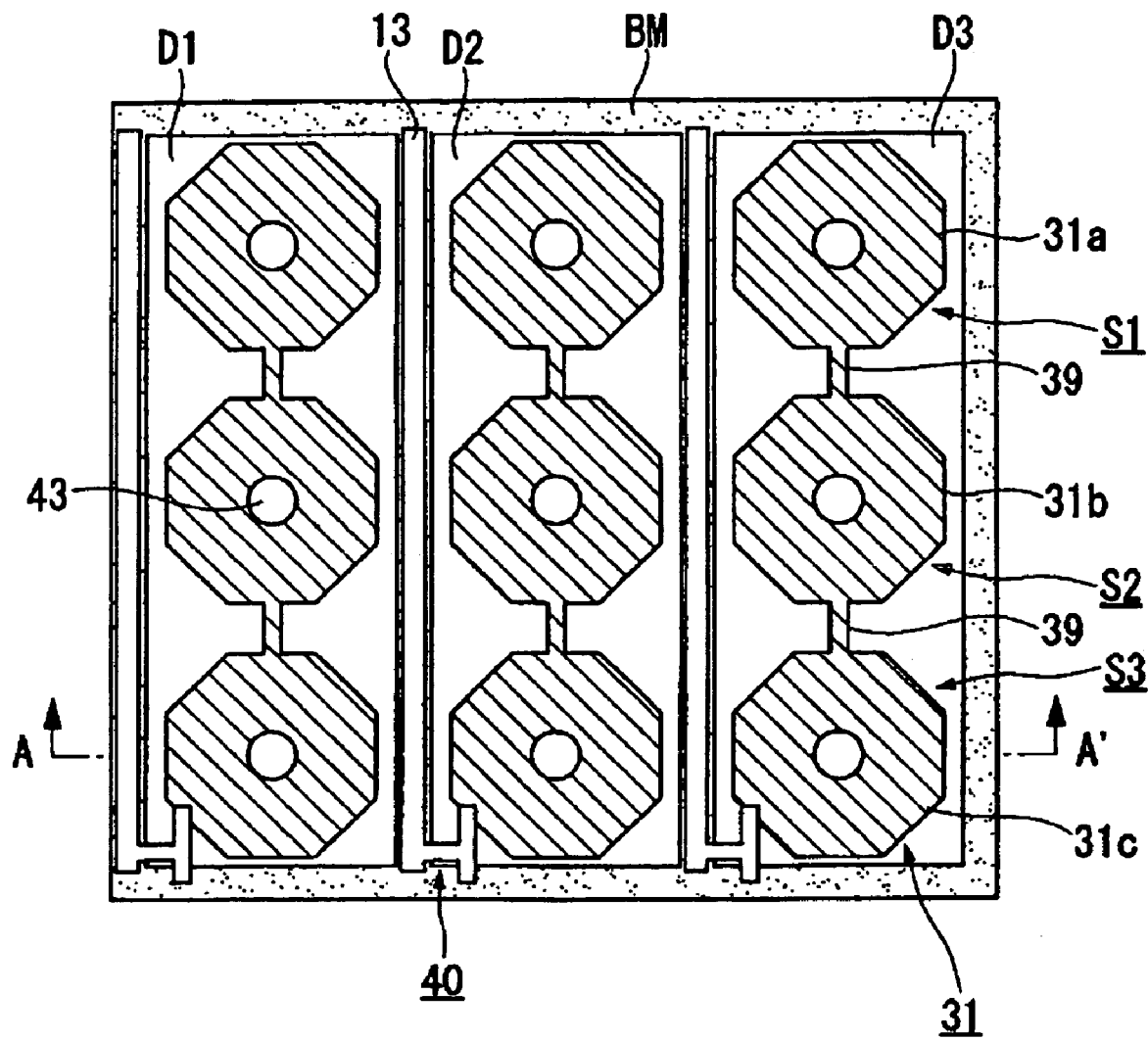
FIG. 3 is a plan view illustrating one pixel of the liquid crystal display device according to the first embodiment.
Figure 4:
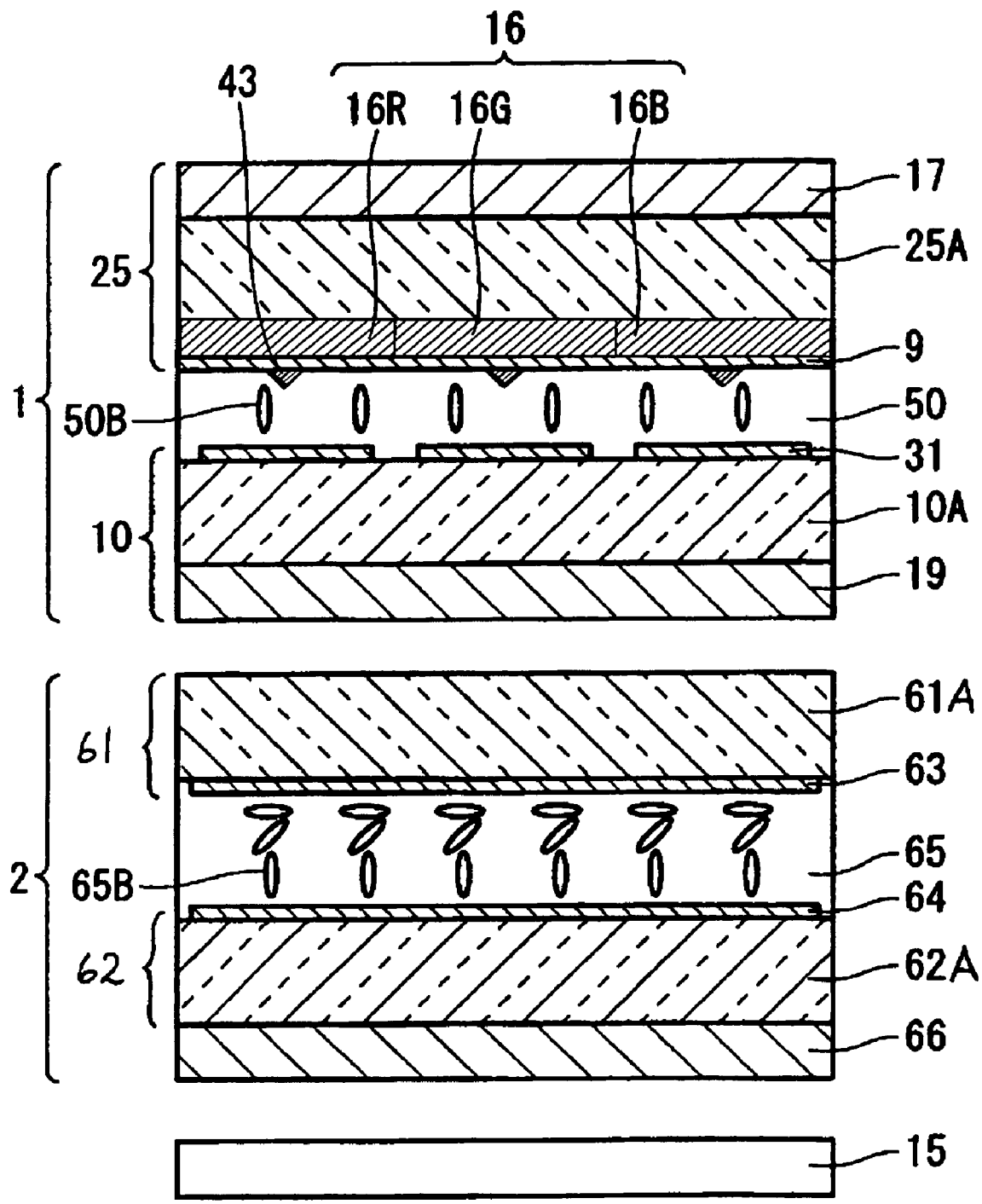
FIG. 4 is a cross-sectional view taken along the line A-A' of FIG. 3.

Next, the pixel structure of the liquid crystal display device 100 according to the present embodiment will be described with reference to FIGS. 3 and 4. FIG. 3 is a view schematically illustrating the pixel structure of the display panel, particularly the plane structure of the pixel electrode 31. FIG. 4 is a cross-sectional view illustrating the overall structure of the liquid crystal display device including a liquid crystal panel for visual angle control and is a cross-sectional view taken along the line A-A' of FIG. 3.

As shown in FIG. 2, in the liquid crystal display device 100 of the present embodiment, the pixel electrodes 31 are respectively formed in dot regions surrounded by the data lines 9 and the scanning lines 13. As shown in FIG. 4, in the dot regions, a colored layer 16 having any one of the three primary colors is provided in one dot region, and three dot regions (D1, D2, and D3) adjacent to each other constitute one pixel including colored layers 16B (blue), 16G (green), and 16R (red).

As shown in FIG. 4, in the liquid crystal display device 100 according to the present embodiment, as seen from the upper side (the user side), a display panel 1, a viewing angle control panel 2, and a backlight 15 are stacked in this order. FIG. 4 shows the display panel 1, the viewing angle control panel 2, and the backlight 15, separated from each other. However, practically, it is preferable that these components be tightly bonded to each other in some manner.

First, the display panel 1 will be described.

In the display panel 1, a liquid crystal layer 50 made of a liquid crystal material vertically aligned in an initial state and having a negative dielectric anisotropy is interposed between an upper substrate (counter substrate) 25 and a lower substrate (element substrate) 10 opposite to the upper substrate 25. Further, a chiral material may be added to the liquid crystal layer 50 in order to improve transmittance.

In the upper substrate 25, a color filter 16 having the red colored layer 16R, the green colored layer 16G, and the blue colored layer 16B are provided on an inner surface of a substrate body 25A (a surface of the substrate body 25A facing the liquid crystal layer) made of a transmissive material, such as a glass or a quartz. Although not shown in FIG. 4, the respective colored layers 16R, 16B, and 16G are surrounded by a black matrix BM made of, for example, metal chrome, and the black matrix BM forms the boundaries among the respective dot regions D1, D2, and D3 (see FIG. 3). The counter electrode 9 composed of a transparent conductive film made of, for example, indium tin oxide (hereinafter, referred to as ITO) is formed on the color filter 16, and an alignment film (not shown) made of, for example, polyimide is formed on the counter electrode 9. The alignment film functions as a vertical alignment film for vertically aligning liquid crystal molecules with respect to the surface of the film. No rubbing process or other alignment process is performed on the alignment film. Further, in FIG. 4, the counter electrode 9 is formed in a stripe shape extending in the lengthwise direction of the plane of FIG. 4 and functions as an electrode common to the plurality of dot regions provided parallel to the lengthwise direction of the plane of FIG. 4. Furthermore, projections 43 for controlling alignment are formed on the counter electrode 9 so as to protrude toward the liquid crystal layer 50. The projections 43 are made of resin and are formed in cone shapes, truncated cone shapes, polygonal pyramid shapes, truncated polygonal pyramid shapes, or hemisphere shapes obtained by smoothing the edges thereof.

In the lower substrate 10, the pixel electrodes 31 composed of a transparent conductive film, such as an ITO film, and an alignment film (not shown) made of, for example, polyimide and having a vertically aligning function are formed on an inner surface of a substrate body 10A made of a transmissive material, such as a glass or a quartz. Further, the TFD element and the scanning line are not shown in FIG. 4. Particularly, in the present embodiment, as shown in FIG. 3, each pixel electrode 31 includes a plurality of island-shaped portions 31a, 31b, and 31c, and the island-shaped portions 31a, 31b, and 31c are electrically connected to each other through the connecting portions 39 to form the pixel electrode 31. That is, in the present embodiment, each dot region D1, D2, or D3 is divided into a plurality (three in FIG. 3) of sub-dot regions S1, S2; and S3 having substantially the same shape. In other words, each pixel electrode 31 on the lower substrate 10 includes the plurality (three in FIG. 3) of island-shaped portions 31a, 31b, and 31c and the connecting portions 39 for electrically connecting the respective island-shaped portions adjacent to each other, and the island-shaped portions 31a, 31b, and 31c constitute the sub-dot regions S1, S2, and S3, respectively.

Generally, the aspect ratio of one dot region is 3:1 in a color liquid crystal display device. Therefore, when three sub-dot regions S1, S2, and S3 are provided in each dot region D1, D2, or D3, one sub-dot region is formed substantially in a circle shape or a regular polygon shape. Each sub-dot region S1, S2, or S3 (the island-shaped portion 31a, 31b, or 31c) is formed substantially in a regular octagon shape in FIG. 3, but is not limited thereto. For example, the sub-dot region may be formed in a circle shape or polygon shapes other than the octagon shape. Further, the respective projections 43 on the side of the upper substrate 25 are arranged above the centers of the island-shaped portions 31a, 31b, and 31c having regular octagon shapes on the pixel electrodes 31. The liquid crystal molecules 50B of the liquid crystal layer 50 are vertically aligned when a non-selection voltage is applied (voltage off). However, when a selection voltage is applied (voltage on), a fringe electric field by the island-shaped portions of the pixel electrodes 31 is added to the effect induced by the shape of the projections 43, so that the liquid crystal molecules 50B in all directions (360°) around the protrusions 43 align substantially perpendicular with the surface of the protrusions 43. (An image similar to the liquid crystal molecules 50B in this state would be the inclined state of the spines of a sea urchin or the petals of a flower.) This alignment control enables the liquid crystal display device to have a wider viewing angle. Alternatively, instead of providing the projections 43, the counter electrode 9 may be patterned to form polygonal or circular openings. In this case, the same effects as those described above can also be obtained.

Next, the viewing angle control panel 2 will be described.

The visual angle control panel 2 includes a liquid crystal layer 65 interposed between an upper substrate 61 and a lower substrate 62 opposite to the upper substrate 25. The liquid crystal layer 65 is made of a liquid crystal material whose initial alignment state is a hybrid alignment state and which has a negative dielectric anisotropy.

A "hybrid alignment" results from a homeotropic alignment (liquid crystal director perpendicular to bounding surface) at one substrate surface and homogeneous alignment at the surface of the opposite substrate. As shown in FIG. 4, this results in sets of liquid crystal molecules aligned between the two substrates having different tilt angles. In the example shown in FIG. 4, those liquid crystal molecules at the interface of one substrate are aligned substantially parallel with the surface of the substrate. Those liquid crystal molecules at the interface of the other substrate are aligned substantially perpendicular to the surface of the other substrate. Intervening liquid crystal molecules have tilt angles in between the parallel and perpendicular tilt angles. Although FIG. 4 shows only a single intervening liquid crystal molecule for each pair of liquid crystal molecules that are adjacent the opposing substrates, there are actually many intervening liquid crystal molecules with tilt angles varying gradually between the parallel and perpendicular tilt angles, resulting in a continuous change in tilt angle of liquid crystal molecules from one substrate to the other substrate. Generally, the liquid crystal molecules with a hybrid alignment are not twisted, that is, have a twist angle of zero.

The upper substrate 61 includes an upper electrode 63 formed to an inner surface of a substrate body 61A made of a transmissive material, such as glass. The upper electrode 63 is composed of a transparent conductive film, such as an ITO film. Similarly, the lower substrate 62 includes a lower electrode 64 formed over an inner surface of a substrate body 62A made of a transmissive material, such as glass. The lower electrode 64 is composed of a transparent conductive film, such as an ITO film. The electrodes 63, 64 are for applying an electric field to the liquid crystal. In the viewing angle control panel 2, these upper electrode 63 and lower electrode 64 are not divided into dot regions, but are formed on the entire surface of the substrate 61 and the entire surface of the substrate 62, respectively.

The liquid crystal layer 65 has a hybrid alignment structure in which the liquid crystal molecules are aligned substantially in the horizontal direction on an interface on the side of the upper substrate 61 and are aligned substantially in the vertical direction on an interface on the side of the lower substrate 62, and in which the tilt angle of the liquid crystal molecules is continuously changed between both the interfaces. Such an initial alignment state can be obtained by the following process. A polyimide film for horizontal alignment is formed on the upper electrode 63 of the upper substrate 61 and a baking process and a rubbing process are sequentially performed on the polyimide film. For the lower substrate 62, a polyimide film for vertical alignment is formed on the lower electrode 64, and a baking process is performed on the polyimide film. To insure more stable alignment, it is preferable that the rubbing process be performed on the polyimide for vertical alignment in a direction opposite to the rubbing direction of the polyimide for horizontal alignment in order not to generate a reverse spray domain. Further, it is possible to align the liquid crystal molecules of the liquid crystal layer 65 substantially in the horizontal direction with respect to the surface of the substrate by applying a voltage between the upper electrode 63 and the lower electrode 65. In addition, contrary to the present embodiment, the liquid crystal layer may have an alignment structure in which the liquid crystal molecules are aligned substantially in the vertical direction on the interface on the side of the upper substrate 61 and they are aligned substantially in the horizontal direction on the interface on the side of the lower substrate 62. As described above, the liquid crystal material having a negative dielectric anisotropy is used in the liquid crystal layer 65, and the product $\Delta n \cdot d$ of the birefringence $\Delta n$ and the thickness d of the liquid crystal layer is set to 6.0 μm.

Figure 5:
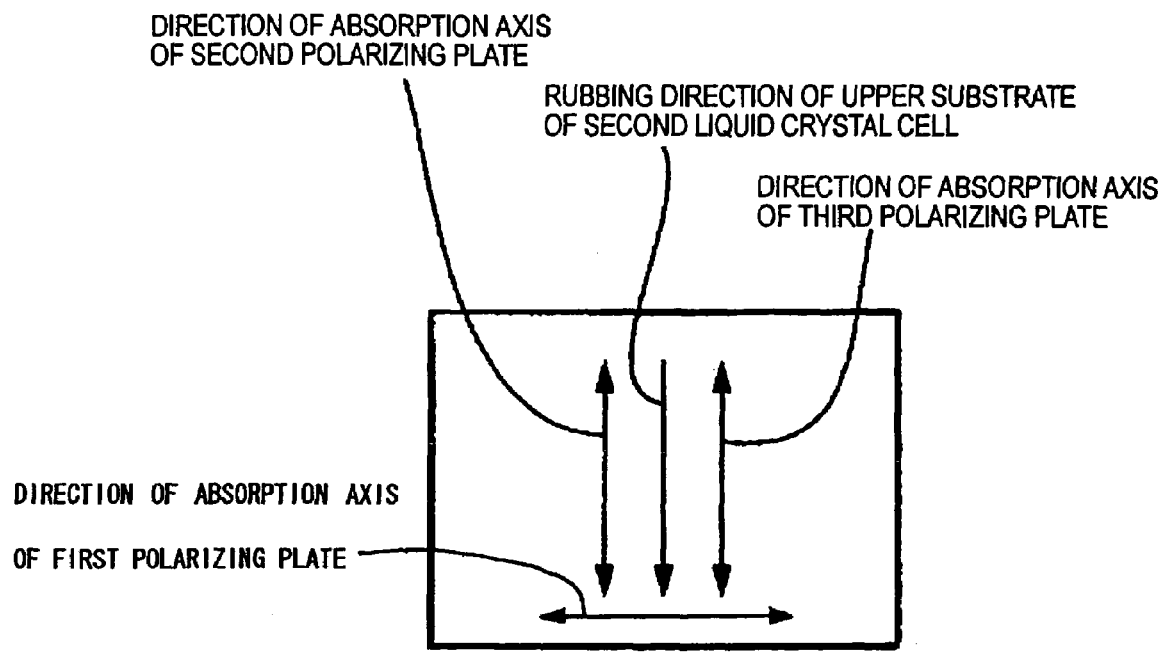
FIG. 5 is a view illustrating the relationship between each polarizing plate and a rubbing direction in the liquid crystal display device according to the first embodiment.

Further, a first polarizing plate 17 is provided on an outer surface of the upper substrate 25 in the display panel 1, and a second polarizing plate 66 is provided on an outer surface of the lower substrate 62 in the viewing angle control panel 2. In addition, a third polarizing plate 19 is provided between the lower substrate 10 of the display panel 1 and the upper substrate 61 of the viewing angle control panel 2. As shown in FIG. 5, the second polarizing plate 66 and the third polarizing plate 19 are arranged such that the directions of the absorption axes thereof are parallel to each other and are equal to the vertical direction (the direction of 12 o'clock to the direction of 6 o'clock) of a display screen as the display screen is seen from the front. In addition, the absorption axes of the second polarizing plate 66 and the third polarizing plate 19 are arranged parallel to the direction of a slow axis of the liquid crystal layer 65 viewed from the direction normal to (perpendicular to) the liquid crystal panel 2. The direction of the slow axis of the liquid crystal layer 65 in the viewing angle control panel 2 is equal to the rubbing direction of the upper substrate 61 in the viewing angle control panel 2, that is, the absorption axes of the second polarizing plate 66 and the third polarizing plate 19 is set parallel to the rubbing direction of the upper substrate 61 in the viewing angle control panel 2 (which is illustrated as the rubbing direction of an upper substrate of a second liquid crystal panel in FIG. 5). Therefore, as shown in FIG. 5, the rubbing direction of the upper substrate 61 is the vertical direction of the screen, that is, the direction from 12 o'clock to 6 o'clock or the direction from 6 o'clock to 12 o'clock. In addition, the absorption axis of the first polarizing plate 17 is orthogonal to the absorption axes of the second polarizing plate 66 and the third polarizing plate 19, and the display panel is formed in a normally black structure. Further, the backlight 15 serving as a light source for transmissive display is provided on an outer surface of the second polarizing plate 66 formed on the outer surface of the viewing angle control panel 2.

Since the birefringence $\Delta n$ of normal liquid crystal has an upper limit of about 0.25, the liquid crystal layer 65 of the viewing angle control panel 2 needs to have a thickness 'd' larger than 25 μm in order to obtain $\Delta n \cdot d=6.0$. Circular shaped spacers for maintaining the thickness of the liquid crystal layer of 25 μm must have a diameter of about 25 μm, which can be seen as a bright spot by the naked eye. The same can be said for spacers having a cylindrical shape. To reduce visibility of such bright spots, a scattering plate may be provided between the third polarizing plate 19 and the lower substrate 10 of the display panel 1 or between the third polarizing plate 19 and the upper substrate 61 of the viewing angle control panel 2. A scattering plate in which forward scattering is greater than backward scattering and transparent beads are dispersed in an adhesive is preferably used.

In the liquid crystal display device having the above-mentioned structure, since the viewing angle control panel 2 is provided with the liquid crystal layer 65 having the hybrid alignment structure, the original viewing angle of the display panel 1 is narrowed when the non-selection voltage is applied (voltage off). Thus, the liquid crystal display device can exhibit a viewing angle control effect.

The effect will be described below.

Figures 6A, 6B:
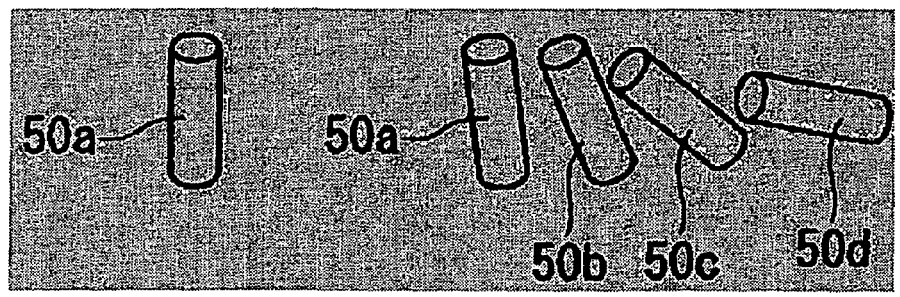
FIGS. 6A and 6B are schematic views for explaining the principle of viewing angle control according to the first embodiment.

For example, in the arrangement of optical axes shown in FIG. 5, as the liquid crystal layer 65 having the hybrid arrangement is seen from the normal direction of the viewing angle control panel 2, the directions of the slow axes of the liquid crystal molecules 50a are seen to overlap each other on a strait line from the upper side to the lower side of the liquid crystal layer 65, as shown in FIG. 6A. On the contrary, as the liquid crystal layer 65 having the hybrid alignment is obliquely seen from the right side with respect to the normal direction, the directions of the slow axes of the liquid crystal molecules 50a to 50d are seen to be twisted from the vertical direction to the horizontal direction of the plane in FIG. 6B from the liquid crystal molecule 50a at the upper side of the liquid crystal layer 65 to the liquid crystal molecule 50d at the lower side thereof, as shown in FIG. 6B. This means that, for light obliquely incident from the right or left side with respect to the normal direction of the viewing angle control panel 2, the liquid crystal layer 65 is twist-aligned by 90 degrees in appearance. That is, optical rotation occurs in light obliquely incident, and the light is emitted from the backlight 15 and then passes through the second polarizing plate 66 to be linearly polarized. The linearly polarized light is optically activated and then is absorbed by the absorption axis of the third polarizing plate 19. However, under the parallel Nicols, as the liquid crystal layer is obliquely seen, dark display appears as in a normally bright type TN mode. Meanwhile, as seen from the front, the brightness of the display panel 1 is maintained since optical rotation does not occur.

Meanwhile, when the selection voltage is applied (voltage on), the hybrid alignment state is broken, and since the liquid crystal material having a negative dielectric anisotropy is used for the liquid crystal layer 65, all the liquid crystal molecules are inclined substantially in the horizontal direction with respect to the surface of the substrate. In this case, optical rotation does not occur in light obliquely incident from the right side or left side of the viewing angle control panel 2 as well as light incident in the normal direction thereof Therefore, the display brightness of the display panel 1 is maintained over the entire range of the viewing angle.

As such, the liquid crystal display device according to the present embodiment adopts a method that reduces brightness without reducing contrast in the wide viewing angle direction, unlike the conventional technique. Thus, it is possible to obtain a more efficient viewing angle control effect.

Figure 7:
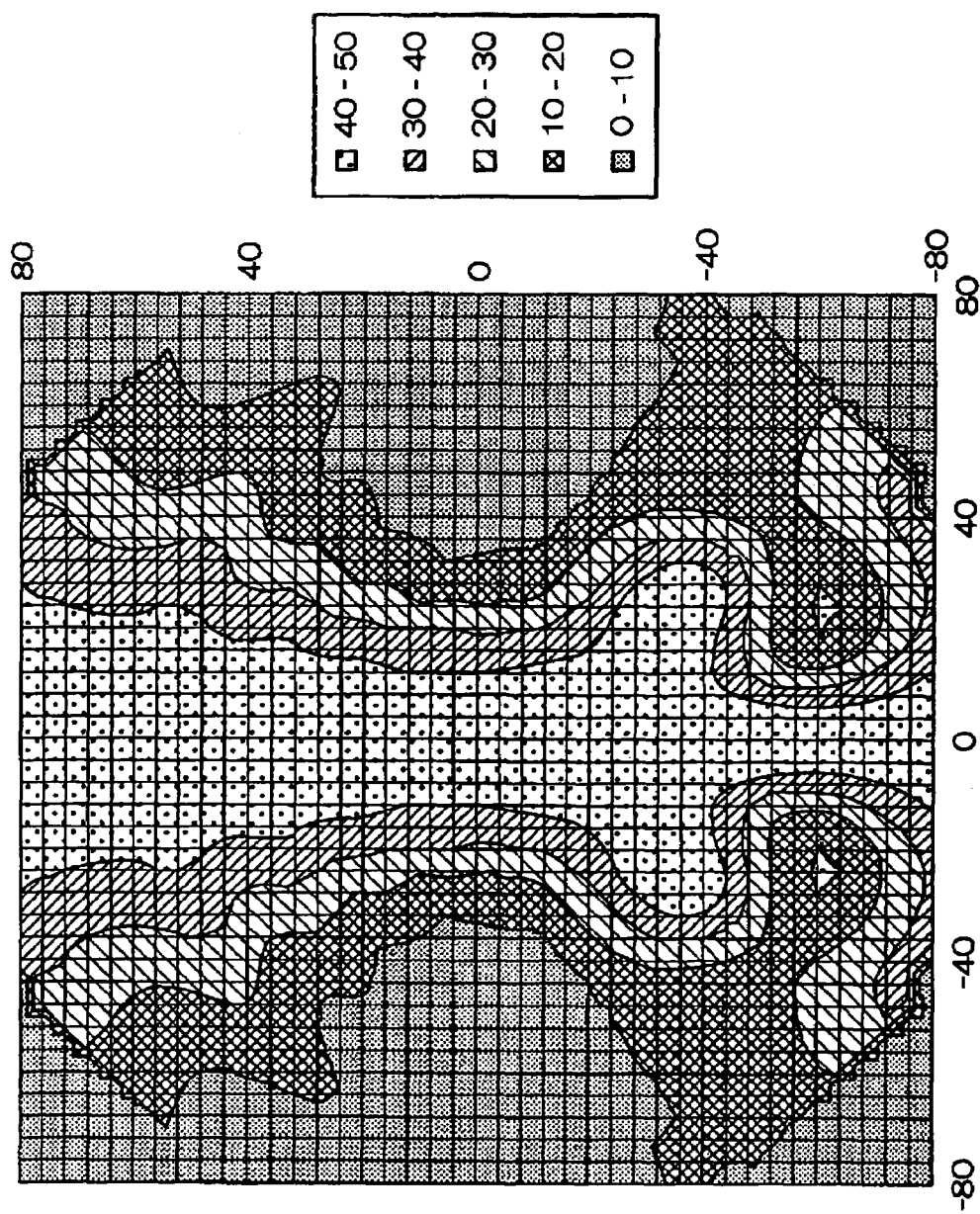
FIG. 7 is a chart showing a viewing angle characteristic of the liquid crystal display device according to the first embodiment when no voltage is applied.
Figure 8:
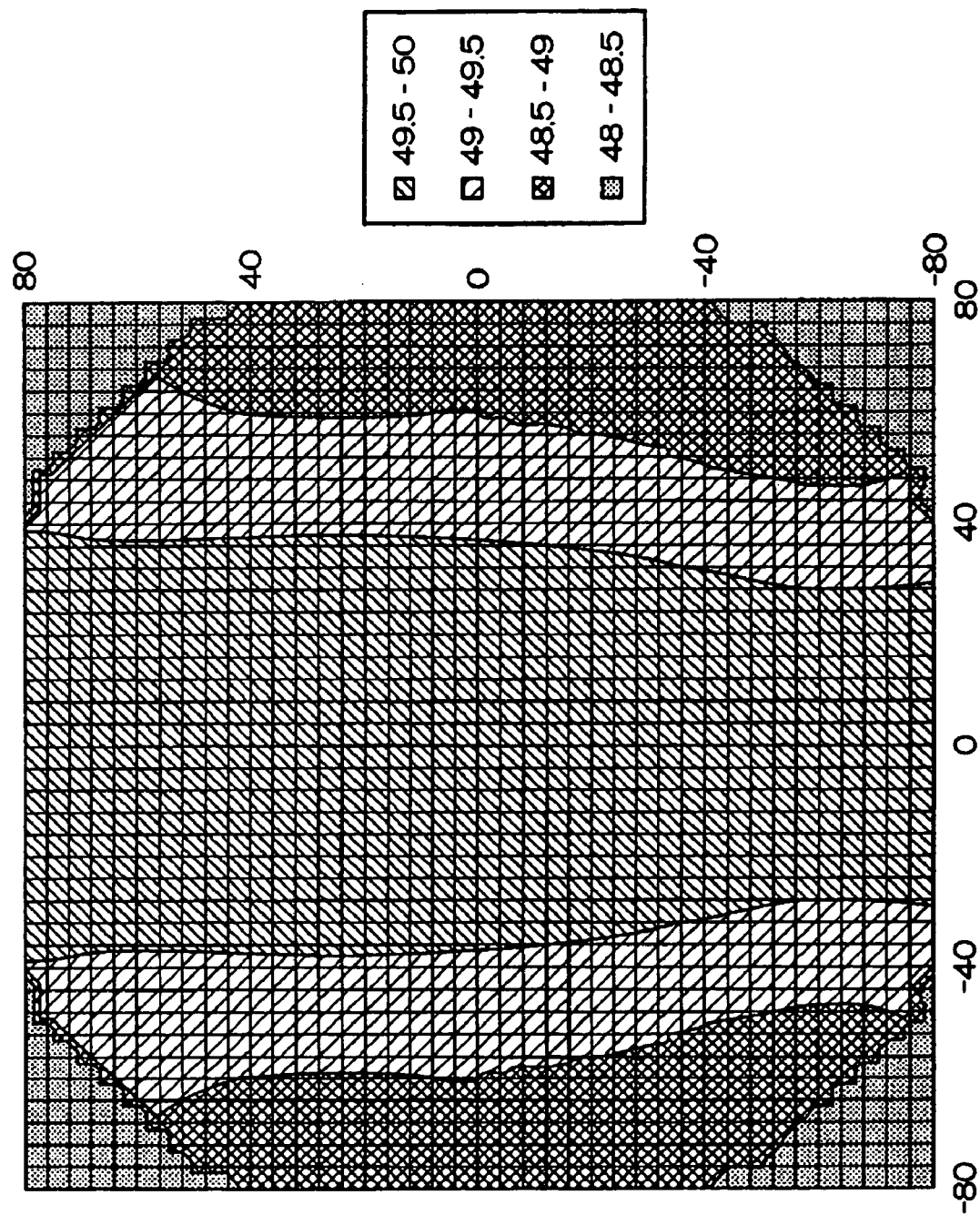
FIG. 8 is a chart showing the viewing angle characteristic of the liquid crystal display device according to the first embodiment when a voltage is applied.

FIGS. 7 and 8 show the results obtained by measuring a viewing angle characteristic using only the viewing angle control panel, the second polarizing plate, and the third polarizing plate of the present embodiment. FIG. 7 shows a transmittance curve when no voltage is applied, and FIG. 8 shows a transmittance curve when a voltage is applied (when a square wave alternating voltage having an applied voltage of ±10 V and a frequency of 100 Hz is applied). In FIGS. 7 and 8, the horizontal axis and the vertical axis indicate polar angles (°) with respect to the normal direction of the liquid crystal panel. Said differently, a polar angle is a specific viewing angle in between the planer surface of the liquid crystal panel and the direction normal to the planer surface. Since the transmittance curve indicates just the viewing angle characteristic of the viewing angle control panel, the entire viewing angle characteristic of the liquid crystal display device is obtained by multiplying the viewing angle characteristic of the viewing angle control panel by the viewing angle characteristic of the display panel.

As shown in FIG. 8, when a voltage is applied, transmittance is in the range of 48 to 50% in the entire viewing angle region, that is, one linearly polarized light passes through the entire region. Therefore, the wide viewing angle characteristic of the display panel is maintained as it is. On the other side, as shown in FIG. 7, when no voltage is applied, a low transmittance region is generated, that is, a region having a transmittance of 0 to 10% is widened to the center of FIG. 7 particularly in the horizontal direction (the direction of 3 o'clock to the direction of 9 o'clock). Therefore, it is possible to efficiently prevent people from peeking at the displayed images from the side (in the horizontal direction).

Figure 9:
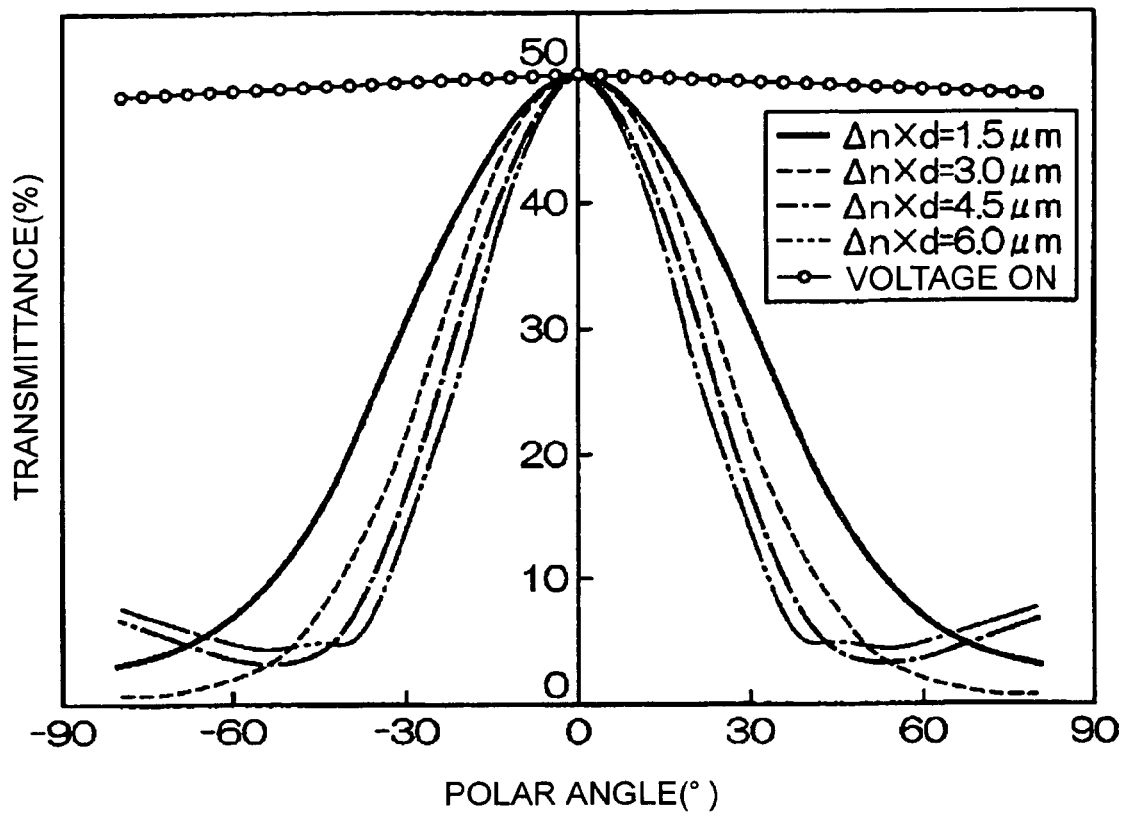
FIG. 9 is a graph showing transmittance in the horizontal direction (3 o'clock to 9 o'clock) of the liquid crystal display device according to the first embodiment.

Further, FIG. 9 is a graph showing transmittance in the horizontal direction (the direction of 3 o'clock to the direction of 9 o'clock) of FIGS. 7 and 8. In FIG. 9, the horizontal axis indicates an polar angle (°), and the vertical axis indicates transmittance (%). In FIGS. 7 and 8, the product $\Delta n \cdot d$ of the birefringence $\Delta n$ and the thickness d of the liquid crystal layer is set to 6.0 μm. However, in FIG. 9, the product $\Delta n \cdot d$ is changed to 1.5 μm (solid line), 3.0 μm (dashed line), and 4.5 μm (one dot-chain line). When the product $\Delta n \cdot d$ is 6.0 μm (two-dot chain line), transmittance in the vicinity of a polar angle of 40° is reduced to 10% of the transmittance in the direction normal to the panel (i.e., transmittance at a polar angle of 0°), so that it is difficult to perceive displayed images from the polar angle larger than 40°. Further, the transmittance characteristic changes with variation of the product $\Delta n \cdot d$. That is, the larger the product $\Delta n \cdot d$ becomes, the greater the viewing angle can be narrowed in the OFF mode. Therefore, in the design of the viewing angle control panel, the degree to which the viewing angle is limited can be controlled by selecting a value of $\Delta n \cdot d$ that is optimum for the purpose of use.

Figure 10:
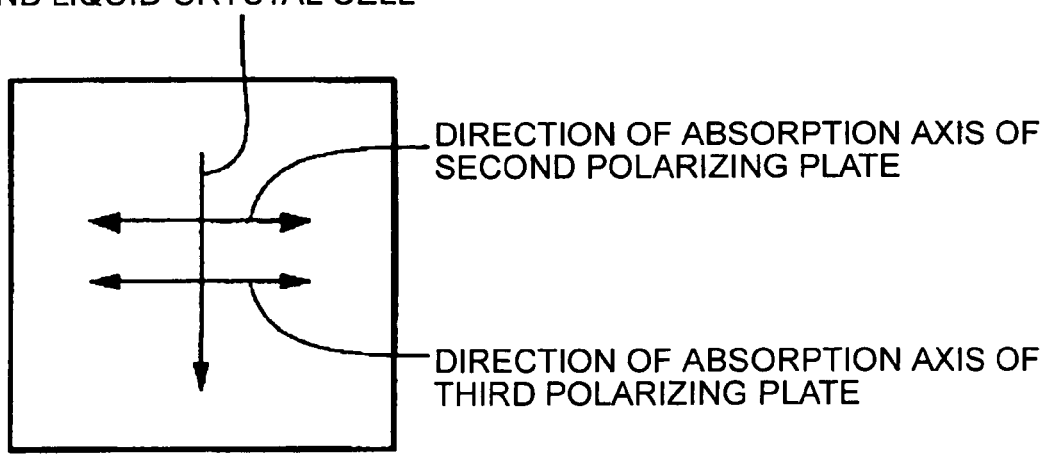
FIG. 10 is a schematic view showing the relationship between each polarizing plate and a rubbing direction in a liquid crystal display device according to a second embodiment of the present invention.

Hereinafter, a second embodiment of the present invention will be described with reference to FIGS. 10 and 11.

The basic structure of a liquid crystal display device according to the present embodiment is the same as that in the first embodiment except that the relationship between the optical axes of the viewing angle control panel is different from that in the first embodiment. Therefore, only the different portion will be described below, and the description of the common portions will be omitted.

In the first embodiment, as shown in FIG. 5, the directions of the absorption axes of the second polarizing plate 66 and the third polarizing plate 19 are arranged parallel to each other in the vertical direction (the direction of 12 o'clock to the direction of 6 o'clock) of the display screen, and the slow axis direction of the liquid crystal layer 65 in the viewing angle control panel 2 is arranged so as to be parallel thereto. On the contrary, in the present embodiment, as shown in FIG. 10, the directions of the absorption axes of the second polarizing plate 66 and the third polarizing plate 19 are arranged parallel to each other in the horizontal direction of the screen (the direction of 3 o'clock to the direction of 9 o'clock). The direction of the slow axis of the liquid crystal layer 65 in the viewing angle control panel 2, that is, the rubbing direction of the upper direction 61 of the viewing angle control panel 2 is arranged in the vertical direction (the direction of 12 o'clock to the direction of 6 o'clock) of the screen. Therefore, the directions of the absorption axes of the second polarizing plate 66 and the third polarizing plate 19 are orthogonal to the direction of the slow axis of the liquid crystal layer 65 in the viewing angle control panel 2. That is, in the present embodiment, only the directions of the absorption axes of the second polarizing plate 66 and the third polarizing plate 19 are rotated from the arrangement of the optical axis of the first embodiment by 90°.

Figure 11:
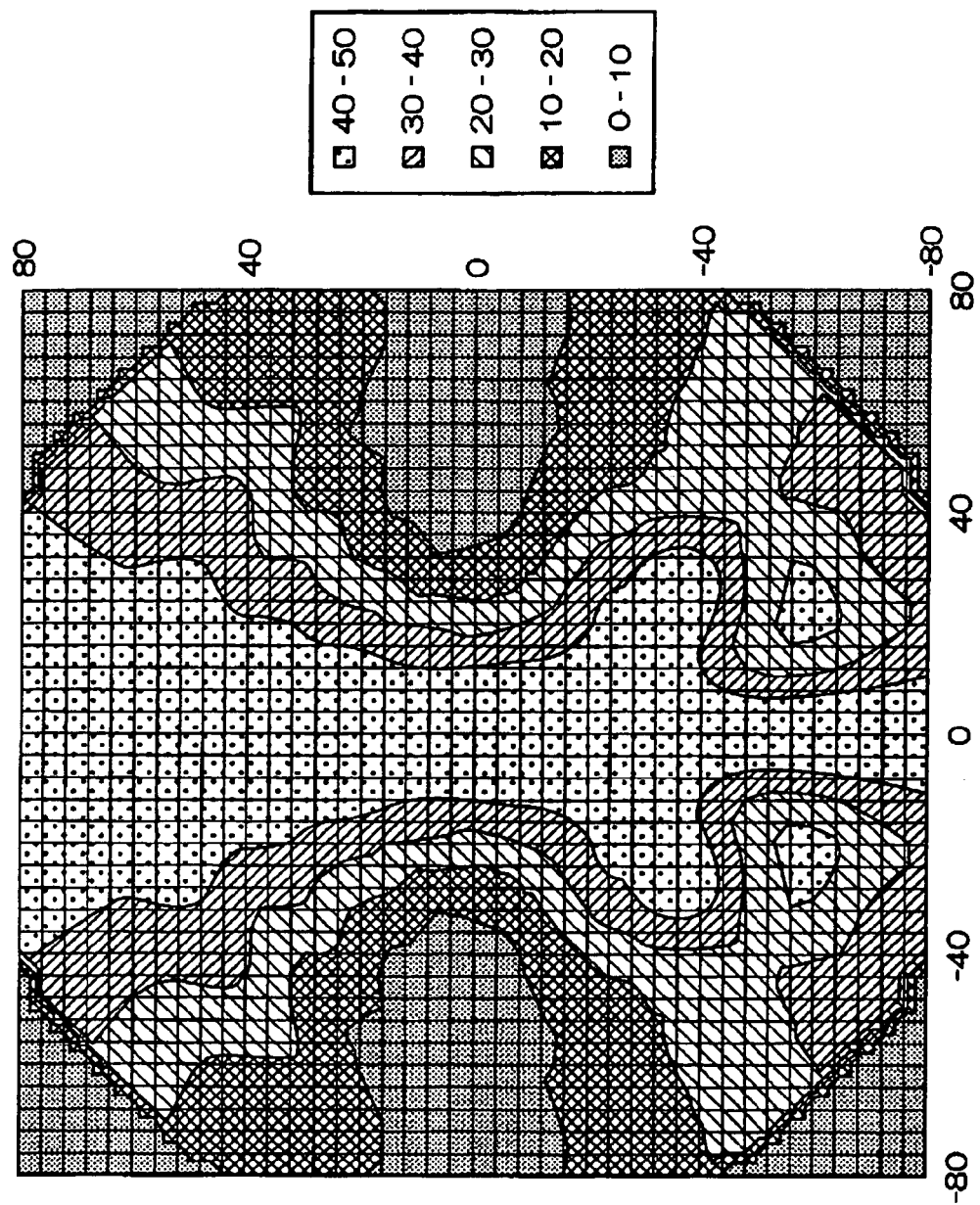
FIG. 11 is a chart showing a viewing angle characteristic of the liquid crystal display device according to the second embodiment when no voltage is applied.

FIG. 11 shows the results obtained by measuring viewing angle characteristics using only the viewing angle control panel, the second polarizing plate, and the third polarizing plate of the present embodiment. FIG. 11 is a view corresponding to the view shown in FIG. 7 of the first embodiment and illustrates a transmittance curve when no voltage is applied.

As shown in FIG. 11, when no voltage is applied, a low transmittance region is generated in the horizontal direction (the direction of 3 o'clock to the direction of 9 o'clock), so that the present embodiment makes it possible to effectively prevent people from peeking at the display from the horizontal side. Further, the absorption axes of the second polarizing plate 66 and the third polarizing plate 19 may be arranged parallel to the slow axis of the viewing angle control panel 2 as in the first embodiment and may be arranged orthogonal thereto as in the present embodiment. However, it is not preferable that they be obliquely arranged since the liquid crystal layer exhibits a birefringence effect, which causes the display characteristics of the display panel to deteriorate.

Compared to FIG. 7 of the first embodiment, a region capable of controlling the viewing angle is narrowed in the oblique direction in FIG. 11. Therefore, the present embodiment is greatly effective in preventing people located horizontally from the display from seeing images on the display, but is only slightly effective in the oblique direction, which restricts the purpose of use. Thus, in this case, it is preferable to adopt the optical axis arrangement according to the first embodiment.

Hereinafter, a third embodiment of the present invention will be described with reference to FIG. 12.

In a liquid crystal display device according to the present embodiment, the structures of a display panel and a viewing angle control panel are the same as those in the first embodiment, but the structures of polarizing plates are different from those in the first embodiment. FIG. 12 is a cross-sectional view of the liquid crystal display device according to the present embodiment. In FIG. 12, the same components as those in FIG. 4 have the same reference numerals, and thus a description thereof will be omitted.

Figure 12:
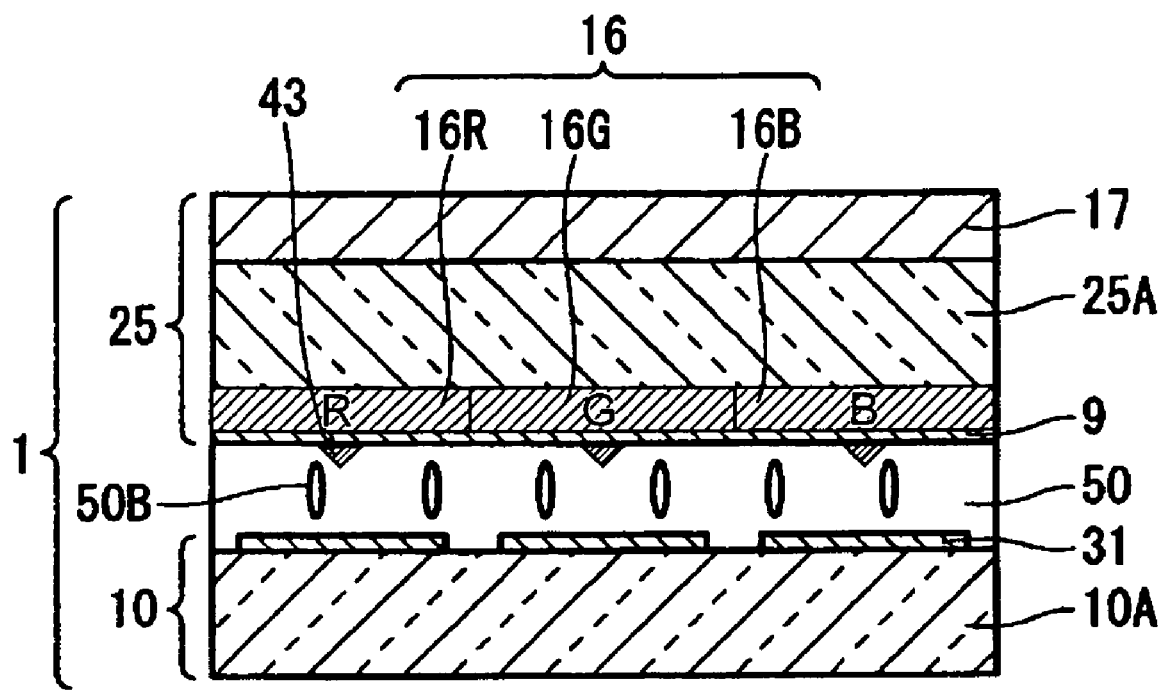
FIG. 12 is a cross-sectional view of a liquid crystal display device according to a third embodiment of the present invention.
Figure 12:
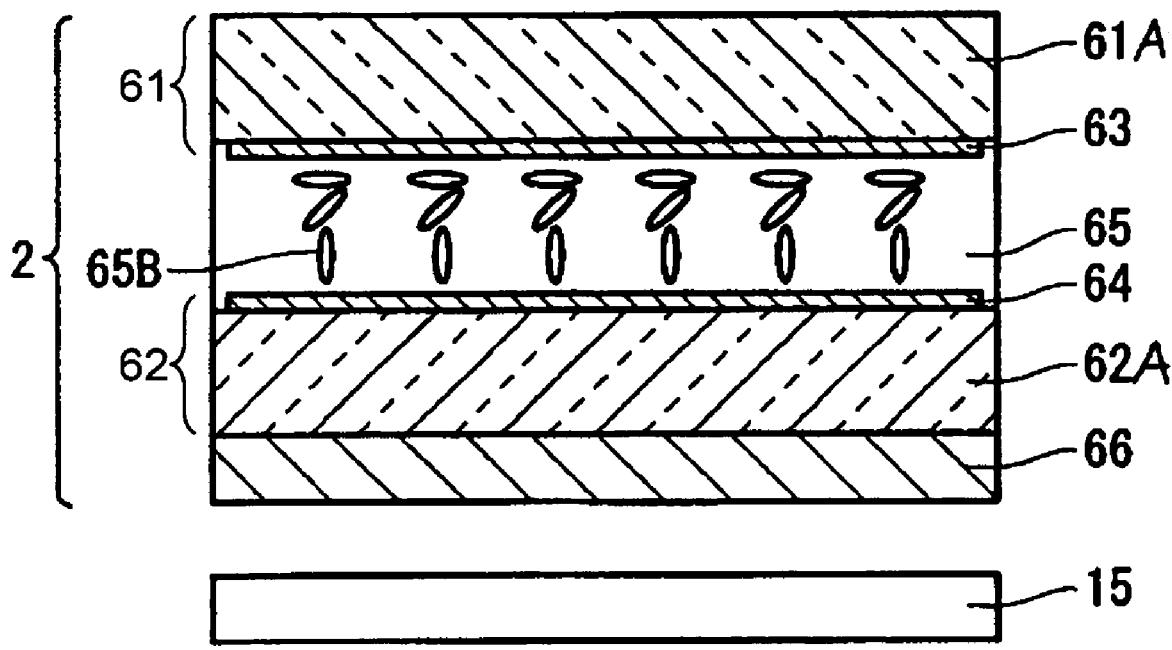

In the liquid crystal display device according to the present embodiment, as shown in FIG. 12, the first polarizing plate 17 is provided on the outer surface of the upper substrate 25 of the display panel 1, and the second polarizing plate 66 is provided on the outer surface of the lower substrate 62 of the viewing angle control panel 2. In the first embodiment, the third polarizing plate 19 is provided between the lower substrate 10 of the display panel 1 and the upper substrate 61 of the viewing angle control panel 2. However, in the present embodiment, the third polarizing plate 19 is not provided. Therefore, in the present embodiment, it is possible to bond the lower substrate of the display panel to the upper substrate of the viewing angle control panel to form one substrate. In this way, it is possible to reduce the thickness of a liquid crystal display device and to decrease the number of components thereof.

As such, even when the third polarizing plate 19 is not used, the viewing angle control panel 2 has a slow axis as seen from the normal direction. Therefore, when the slow axis is arranged orthogonal or parallel to the absorption axis of the second polarizing plate 66, the display characteristics in the normal direction do not deteriorate. Further, the viewing angle control panel 2 does not effect the viewing angle characteristic since liquid crystal molecules are optically aligned substantially in a line at the time of voltage on. Meanwhile, operations and effects different from those in the first embodiment occur by the reciprocal action between the viewing angle control panel 2 and the display panel 1 when no voltage is applied. That is, in the present embodiment, since the third polarizing plate 19 is not present, a positive/negative inversion of display occurs in the viewing angle range in which the viewing angle control panel 2 darkens in the first embodiment, that is, in the vicinity of a polar angle of 40° in the horizontal direction of FIG. 9.

In the liquid crystal display device according to the present embodiment, it is possible to control a viewing angle by the above-mentioned operation. Only the inversed display enables display not to be seen, but the inverse display can be seen according to circumstances. As this is considered, since a region (a region in the vicinity of the boundary where display is inversed) where halfway inversion occurs, such as around a polar angle of 20°, has low contrast, it is difficult to perceive this region. In this case, as can be seen from FIG. 9, the present embodiment makes it possible to control a viewing angle with the value of Δn·d smaller than that in the first embodiment and in the range narrower than that in the first embodiment. Further, in the case of the present embodiment, the brightness of display increases by the amount corresponding to one polarizing plate since the number of polarizing plates is smaller than that in the first embodiment by one, and also it is possible to reduce the thickness of a liquid crystal display device and to decrease the number of components.

Further, it has been described that a great viewing angle control effect is obtained by reducing the amount of transmission light (by darkening) rather than by lowering contrast. However, in the liquid crystal display device according to the present embodiment, a great effect is obtained by lowering contrast rather than by reducing the amount of transmission light. Therefore, in order to obtain a greater viewing angle control effect, it is preferable that the liquid crystal display device be combined with a backlight having a concentrating sheet. As the concentrating sheet, for example, a prism sheet called BEF available from Sumitomo 3M, co., Ltd. may be used. The prism sheet is a sheet on which extremely small prisms having a vertical angle of 90° are arranged and functions to concentrate diffused light in one direction.

Figure 13:
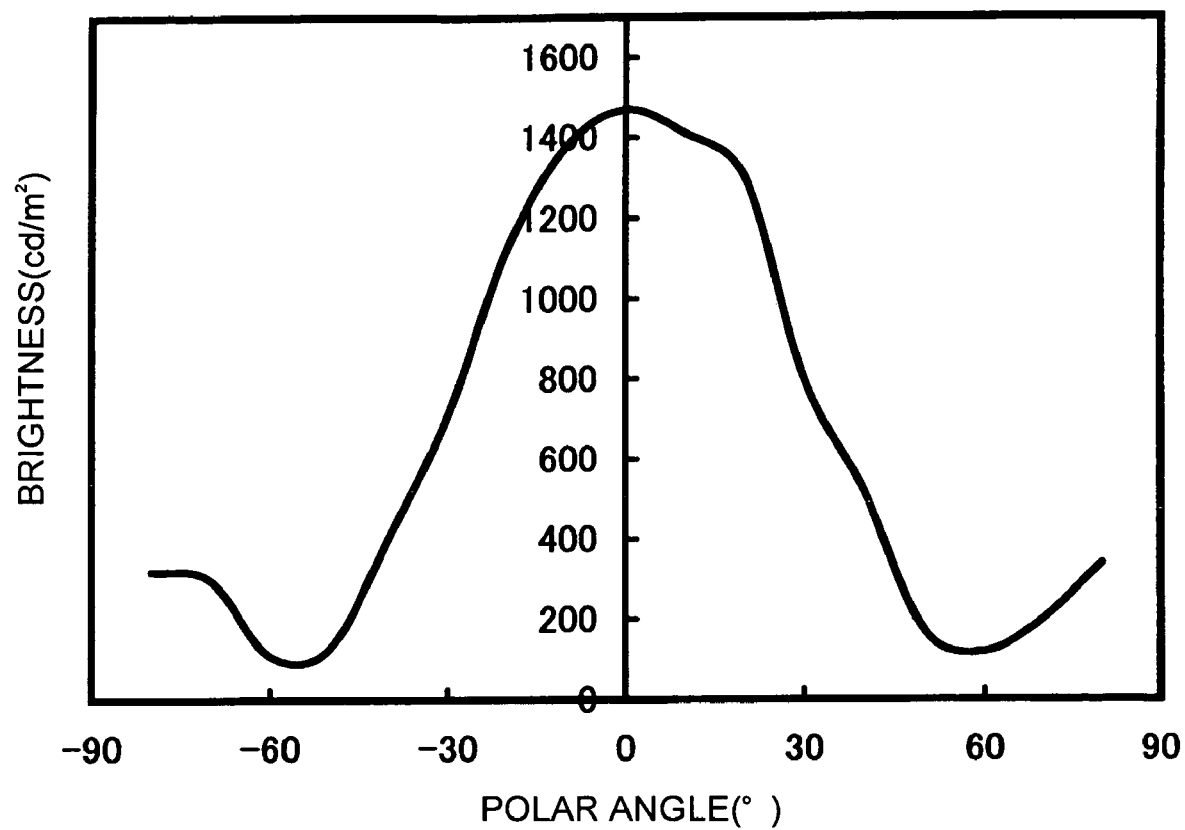
FIG. 13 is a graph showing characteristics of a concentrating sheet used for the third embodiment.

FIG. 13 is a graph illustrating the distribution of brightness with respect to an angle when a sheet of BEF is provided on a backlight emitting diffused light. When BEF is used, it is possible to refract light emitted in the direction of a large polar angle to the direction of a small polar angle, and thus it is possible to improve brightness in the front direction. Further, it is possible to obtain a more effective viewing angle control effect by synergism with the viewing angle control effect by the viewing angle control panel.

Of course, such a concentrating sheet can be applied to the liquid crystal display devices according to the first and second embodiments. In this case, it is possible to obtain a more remarkable viewing angle control effect.

Hereinafter, a fourth embodiment of the present invention will be described with reference to FIG. 14.

The present embodiment is similar to the first embodiment in that a display panel has the same structure as that in the first embodiment, but is different therefrom in that a liquid crystal polymer sheet for viewing angle control is used instead of the viewing angle control panel. FIG. 14 is a cross-sectional view of a liquid crystal display device according to the present embodiment. In FIG. 14, the same components as those in FIG. 4 have the same reference numerals, and thus a description thereof will be omitted.

Figure 14:
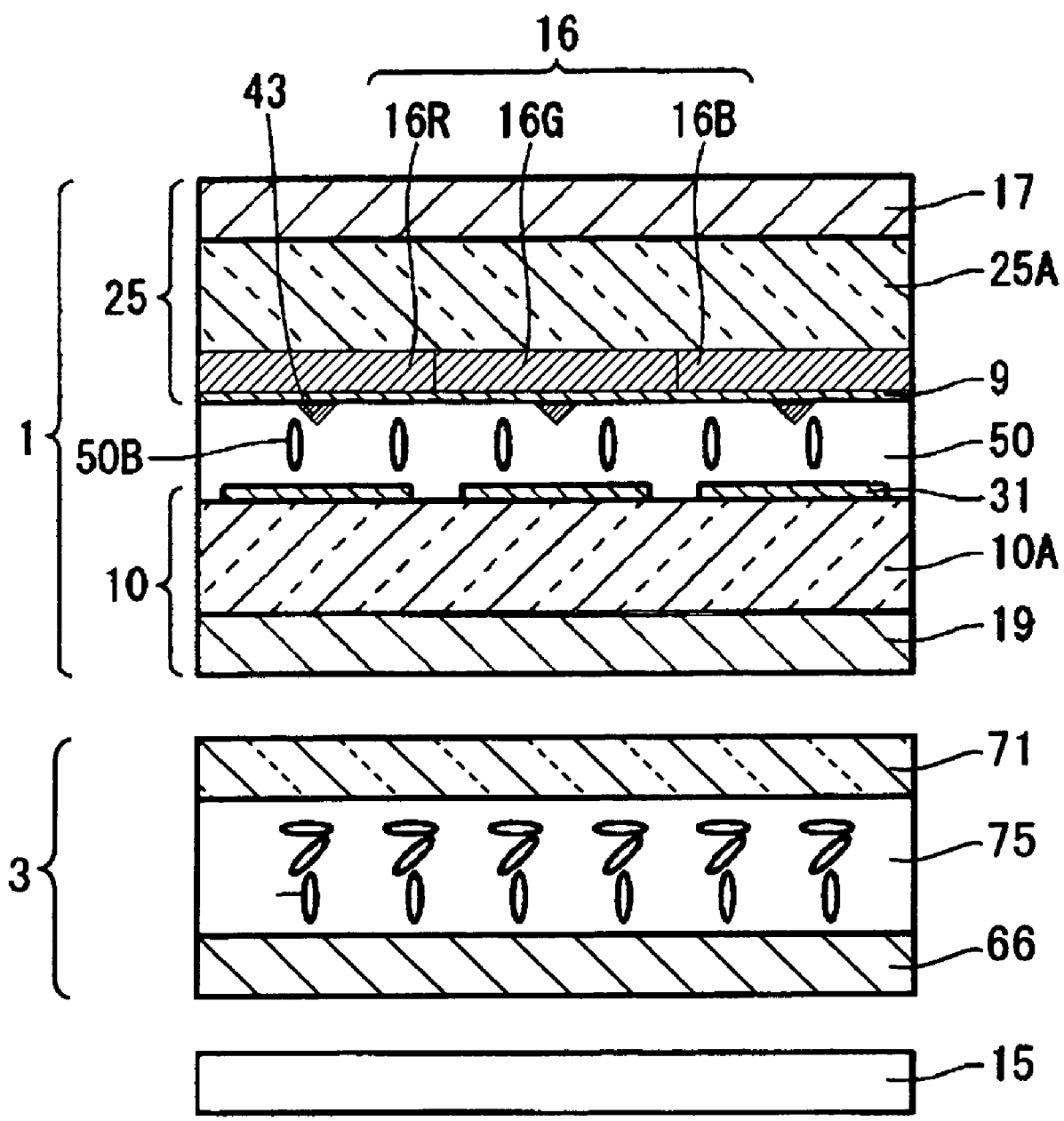
FIG. 14 is a cross-sectional view of a liquid crystal display device according to a fourth embodiment of the present invention.

In the liquid crystal display device according to the present embodiment, as shown in FIG. 14, a liquid crystal polymer sheet 3 for viewing angle control comprising a liquid crystal polymer layer 75 having hybrid-aligned liquid crystal molecules therein, a supporting substrate 71 for supporting the liquid crystal polymer layer 75, and the third polarizing plate 66 is provided adjacent to the display panel 1. As disclosed in, for example, Japanese Unexamined Patent Application Publication No. 10-186356, a liquid crystal polymer layer can be obtained by diluting a positive or negative uniaxial liquid crystal polymer with a proper solvent, by applying it onto a plastic substrate on which a rubbing process has been performed, and by heating and cooling it.

In this way, it is possible to control the viewing angle direction by the same principle as the first embodiment. Of course, it is impossible to control the viewing angle by an electric field, but the viewing angle can be controlled by laminating a plurality of thin liquid crystal polymer sheets. Therefore, the liquid crystal polymer sheet according to the present embodiment can be used for various purposes. The polymer liquid crystal sheet 3 may be attached to the front surface of the display panel 1. In this case, an adhesive that allows the polymer liquid crystal sheet 3 to be repeatedly attached and removed can be used to enable a user to selectively attach and detach the additional polymer liquid crystal sheet as the occasion demands to selectively widen or narrow the viewing angle.

Next, an example of an electronic apparatus having the liquid crystal display device according to the above-mentioned embodiments of the present invention will be described.

Figure 15:
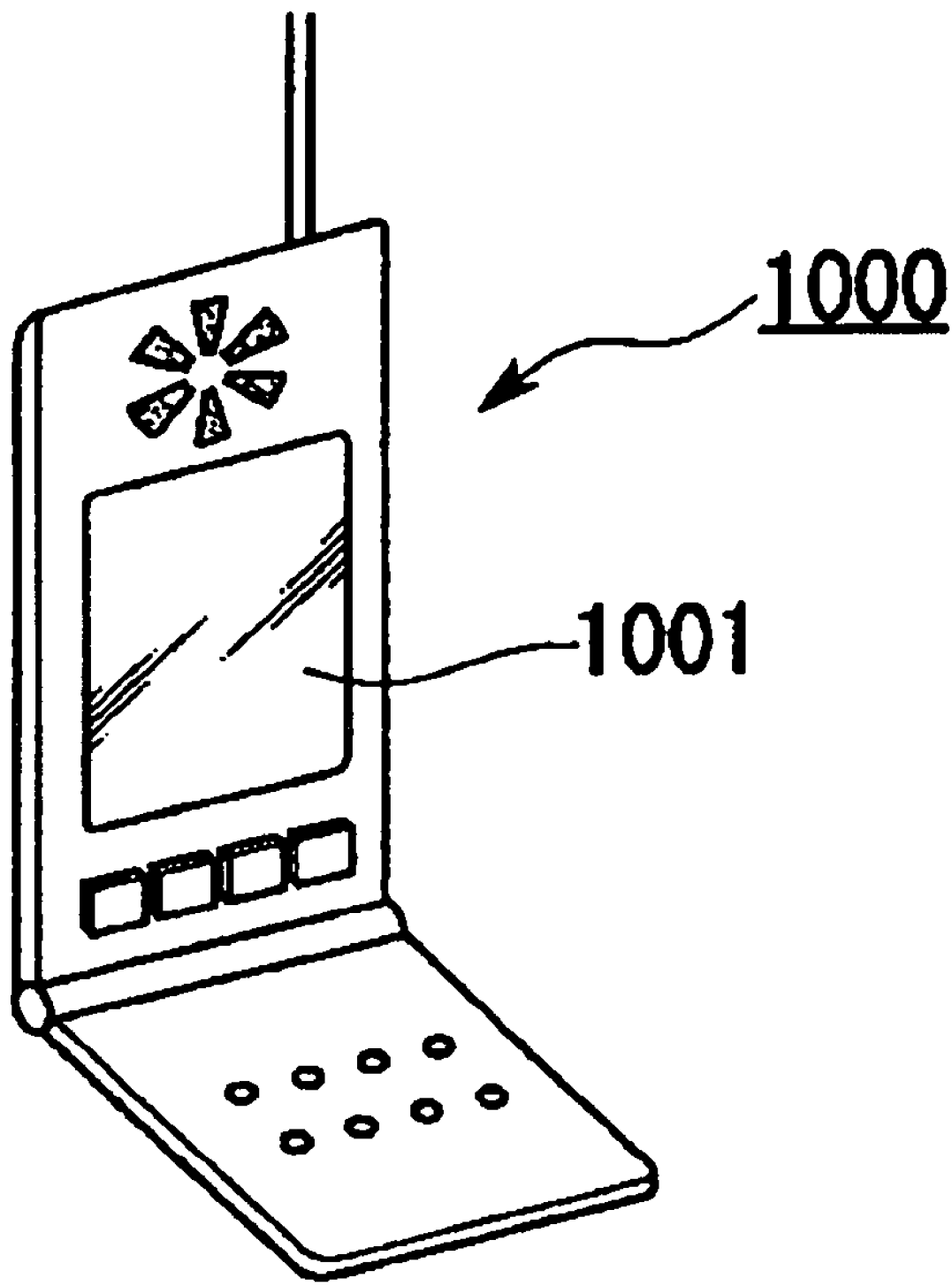
FIG. 15 is a perspective view illustrating an example of an electronic apparatus according to an embodiment the present invention.

FIG. 15 is a perspective view illustrating an example of a mobile phone. In FIG. 15, reference numeral 1000 indicates a mobile phone main body, and reference numeral 1001 indicates a display unit using the above-mentioned liquid crystal display device. When the liquid crystal display device according to the above-mentioned embodiment is used for a display unit of an electronic apparatus, such as a mobile phone, it is possible to realize an electronic apparatus that is provided with a liquid crystal display unit having high switching efficiency between a wide viewing angle and a narrow viewing angle and that is applicable to various utility environments and purposes. The liquid crystal display device according to the present invention can be used to other electronic apparatuses, such as an electronic book, a personal computer, a digital still camera, a liquid crystal television, a view finder-type or monitor-direct-view-type video tape recorder, a car navigation apparatus, a pager, an electronic organizer, an electronic calculator, a word processor, a workstation, a television phone, a POS terminal, and apparatuses equipped with a touch panel.

Furthermore, the technical scope of the present invention is not limited to the above-mentioned embodiments, and various modifications and changes can be made without departing from the spirit and scope of the present invention. For example, in the above-mentioned embodiments, the liquid crystal material having a negative dielectric anisotropy is used for the viewing angle control panel. This is because the liquid crystal material widens the viewing angle at the time of voltage on, so that the viewing angle characteristic of the display panel does not deteriorate. Meanwhile, a liquid crystal material having a positive dielectric anisotropy can be used for the viewing angle control panel. In this case, since there is a fear that the viewing angle characteristic of the display panel will remarkably deteriorate, it is preferable to additionally use a viewing angle correcting filter, such as a C plate. A C plate has three principal optical indices each corresponding to an axis, wherein one of the indices is weaker than the other two indices.

In the above-mentioned embodiments, the viewing angle control panel is provided on the back surface (the side of the backlight) of the display panel as seen from the user side, but may be provided on the front surface (the user side) of the display panel. In this case, a feeling of depth occurs in display, but the same viewing angle control effect is obtained. Further, in the above-mentioned embodiments, a transmissive liquid crystal display device is used for the display panel, but a reflective liquid crystal display device or a transflective liquid crystal display device can be used therefor. Particularly, in many cases, a reflective plate for preventing parallax is mounted in the display panel in these liquid crystal display devices. Therefore, it is preferable that the viewing angle control panel be provided on the front surface (the user side) of the display panel. In addition, a viewing angle control element according to the present embodiment can be used for a CRT (cathode-ray tube), an EL (electroluminescent) device, a PDP (plasma display panel), etc., in addition to the liquid crystal display devices.

What is claimed is:

1. A liquid crystal display device comprising:
   a display panel that displays images;
   a backlight;
   a viewing angle control panel disposed between the display panel and the backlight and overlapping the display panel, the viewing angle control panel including:
   a pair of transparent substrates; and
   a liquid crystal layer interposed between the pair of transparent substrates and having liquid crystal molecules in a hybrid alignment, the liquid crystal molecules of the liquid crystal layer having a slow axis;
   an electric field applying unit that selectively applies an electric field to the liquid crystal layer to change alignment state of the liquid crystal molecules to control the viewing angle range of the display device;
   a first polarizing plate provided at the opposite side of the display panel than the viewing angle control panel;
   a second polarizing plate provided between the backlight and the viewing angle control panel at the opposite side of the viewing angle control panel than the display panel, the second polarizing plate having an absorption axis parallel to the slow axis of the liquid crystal molecules as viewed from a direction normal to the viewing angle control panel; and
   a third polarizing plate provided between the display panel and the viewing angle control panel, the third polarizing plate having an absorption axis parallel to the slow axis of the liquid crystal molecules as viewed from a direction normal to the viewing angle control panel, the second and third polarizing plates having absorption axes that are parallel to each other.

2. The liquid crystal display device according to claim 1, wherein the display panel has upper and lower ends with respect to images displayed on the display panel, the slow axes of the liquid crystal molecules of the liquid crystal layer in the viewing angle control panel aligned in a direction extending between the upper and lower ends of the display panel.

3. The liquid crystal display device according to claim 1, the backlight having a concentrating sheet provided on a surface of the second polarizing plate opposite to the viewing angle control panel.

4. The liquid crystal display device according to claim 1, wherein the display panel has an observer side where the images are displayed, the viewing angle control panel being provided on the side of the display panel opposite to the observer side, and further comprising a diffusing plate provided between the viewing angle control panel and the display panel.

* * * * *